R. C. BERRY.
CARBON REMOVING MEANS FOR INTERNAL COMBUSTION ENGINES.
APPLICATION FILED JUNE 9, 1916.
1,221,959.
Patented Apr. 10, 1917.
2 SHEETS—SHEET 1.
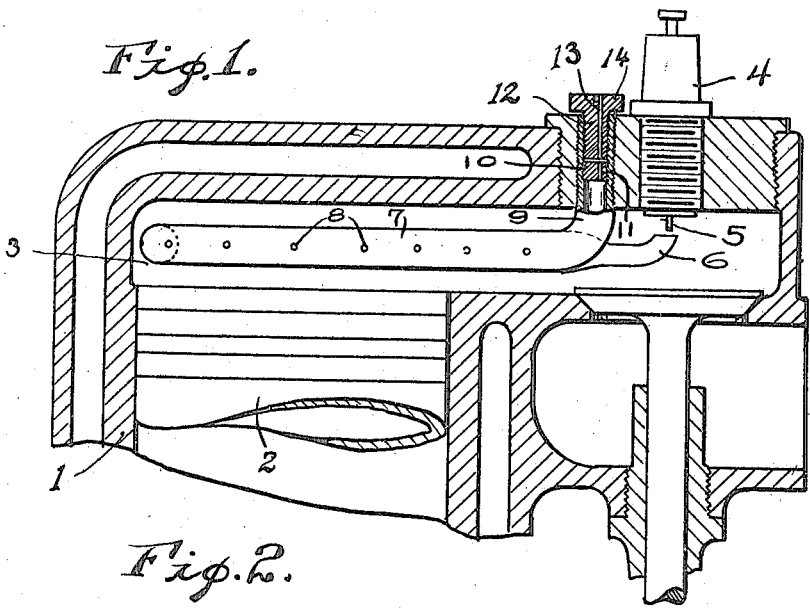
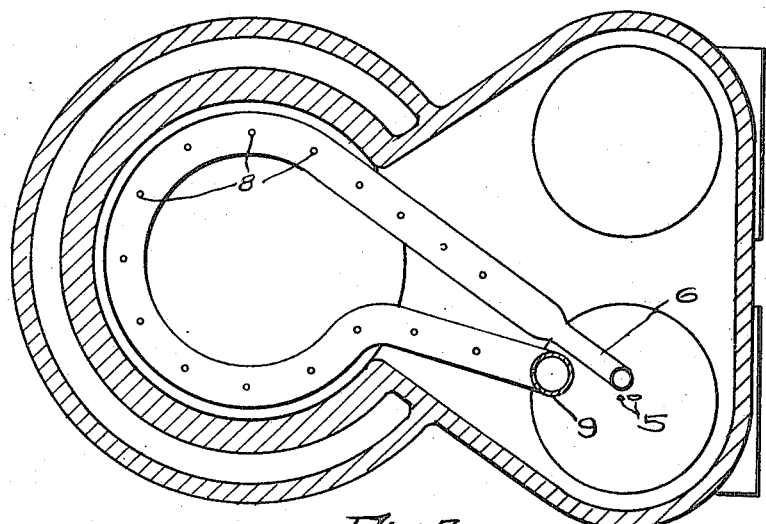
Inventor
Robert C. Berry

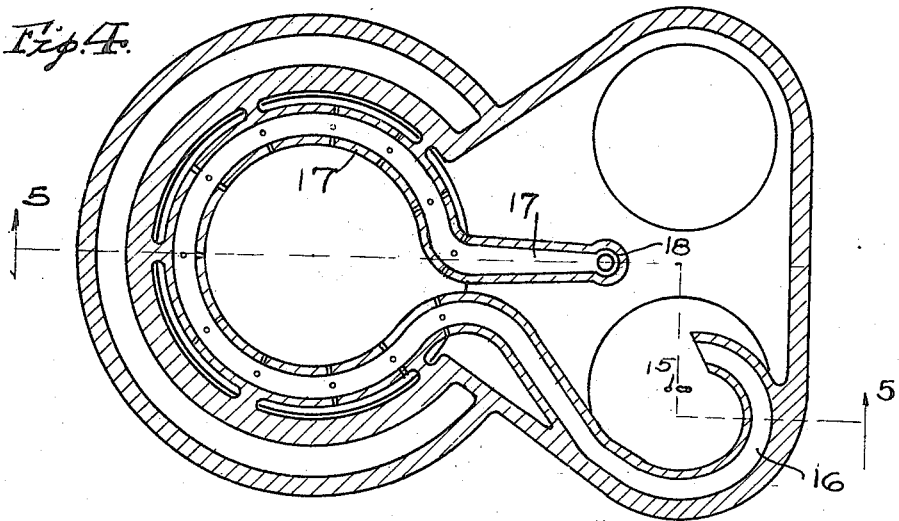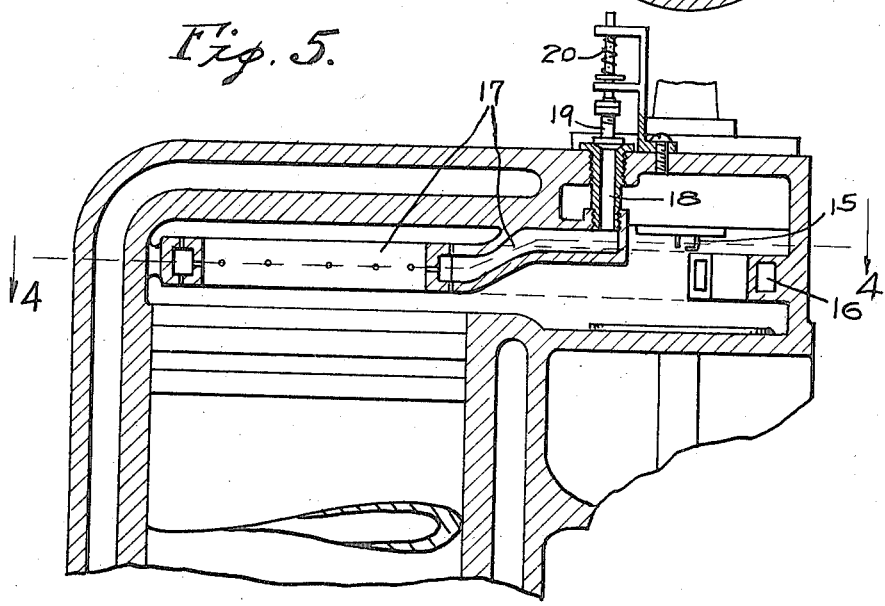

UNITED STATES PATENT OFFICE.

ROBERT C. BERRY, OF INDIANAPOLIS, INDIANA.

CARBON-REMOVING MEANS FOR INTERNAL-COMBUSTION ENGINES.

1,221,959. Specification of Letters Patent. Patented Apr. 10, 1917.

Application filed June 9, 1916. Serial No. 102,728.

*To all whom it may concern:*

Be it known that I, ROBERT C. BERRY, a citizen of the United States, residing at Indianapolis, Marion county, and State of Indiana, have invented and discovered certain new and useful Improvements in Carbon-Removing Means for Internal-Combustion Engines, of which the following is a specification.

My invention relates to carbon removing means for internal combustion engines and its object is to provide means whereby a concentrated current of flame will be directed against those portions of the combustion chamber, including the spark plug, on which carbon is likely to be deposited, in order to burn off the carbon therefrom and to effect this operation by utilizing and directing the force produced by the explosion of a charge in the cylinder. The invention also aims to provide means of a simple and effective character for accomplishing this end, and capable of being readily attached to existing engines or embodied in the structure thereof when made.

With these ends and others in view, my invention is embodied in preferable form in the construction and arrangement hereinafter described and illustrated in the accompanying drawings.

In these drawings, Figure 1 is a vertical section of the upper part of the cylinder of an internal combustion engine showing my improvements applied thereto; Fig. 2, a horizontal section on the line 2—2 of Fig. 1, Fig. 3, a section through the main conduit of the invention, Fig. 4 a plan view of a modified form and Fig. 5, a vertical section of said form.

Referring to the drawings, 1 indicates the cylinder of an internal combustion engine, 2 the piston thereof, and 3, the explosion space in the head. Referring first to the form of the device shown in Figs. 1 and 2, 4 indicates the spark plug which may be of the usual construction. Terminating adjacent the two contacts 5, of the spark plug, and below the spark gap, is the open end of a carbon receiving and conveying pipe or conduit 6 which communicates at its other end with a main pipe or conduit 7 which is adapted to extend circumferentially around the cylinder in the combustion chamber just above the upper limit of travel of the piston. This pipe 7 is perforated throughout its length, preferably on its outer side and through its upper surface, such perforations being provided by means of regularly spaced holes 8, which serve to admit the flame from the cylinder. The perforated pipe 7 communicates by a branch 9 with an opening leading through the cylinder head and in the upper end of the branch is threaded a plug 10 provided with a passageway 11 adapted to establish communication between the pipe and the atmosphere. The passageway of port 11 is controlled by a rotatable valve 12 which is also threaded into the pipe 9 above the plug and which has a longitudinal port or passage way 13 extending therethrough and located off center and capable of registering with the passageway 11. The valve 12 may be provided with a head 14 suitably formed for the engagement of a wrench, screw driver, handle, or other suitable means whereby it may be turned in order to bring the port 13 into registry with the port 11 or to cut off the latter port so as to prevent the passage of the gases therethrough.

In the operation of the device thus described, when it is desired to utilize the same for the purpose of removing the carbon from the spark plug, the valve 12 is turned so as to bring the port 13 into registry with the port 11 and thus establish an open passageway from the pipe 7 and branch 9 through the screw plug 10 and valve 12 to the atmosphere. When the compression stroke takes place the amount of gas which escapes through the ports is so small as to be immaterial. Thereupon, on the explosion stroke of the engine a draft will be created through the perforations 8, the pipe 7 and ports 11 and 13 and a suction will be produced in the pipe 6 which will draw the flame against the spark plug terminals, causing a strong current of flame to be directed upon and drawn across the spark plug. The intense heat thus concentrated at this point will effectually burn off the carbon. Such carbon as is unconsumed will fall into the cylinders and be carried out through the exhaust ports on the exhaust stroke. The pipe 7 performs a similar function with respect to the surrounding walls of the cylinder, cylinder head and adjacent parts, the perforations serving to create a suction through the pipe and out the valve port which will produce a concentrated current of flame against the adjacent wall of the cylinder and cylinder head which will burn off the carbon on the surface thereof.

The heat produced by the concentrated current or blast of flame can be regulated by varying the extent of the opening of the port 13, so as to control the strength of the draft.

In Figs. 4 and 5 a modified form of the device is shown in which the suction draft forming conduits are cast integral with the head of the cylinder. In this construction, 15 indicates the spark plug and 16 a carbon removing conduit leading therefrom and formed by walls of the cylinder head. This conduit communicates with the large perforated conduit 17 extending around the explosion space above the limit of travel of the piston. Leading from the conduit 17 through the cylinder head, adjacent the spark plug, is a passageway 18 adapted to be controlled by an automatic spring pressed valve 19. The tension of the spring 20 controlling such valve is of such strength, and the area of the passageway 18 is so restricted, that the gases will not be forced through the passageway past the valve upon the compression movement of the piston but will be forced out during the explosion stroke of the piston. The operation of this device is substantially the same as that described with reference to the construction shown in Figs. 1 and 2. The gases are forced through the conduit 17 and will draw the flame into the conduit 16 past the spark plug in a strong concentrated current out through the passageway 18, past the auxiliary valve. In this arrangement it will be seen that the controlling valve is automatic in action. The extent of opening of this valve may also be regulated by suitable means of adjustment on the stem controlling the tension of the spring. In both constructions the area of the open end of the conduit adjacent the spark plug is greater than the combined area of the openings in the other conduit.

Having thus described my invention, what I claim is:

1. An internal combustion engine having means operatively associated with the piston and explosion cylinder for inducing a concentrated flow of flame against the inner surface of the combustion chamber by the force of the explosion in the cylinder.

2. An internal combustion engine having a draft inducing opening leading from the combustion chamber and having means for directing a flow of flame produced by the explosion in the cylinder and induced by said opening against the spark plug and adjacent surface of the combustion chamber.

3. An internal combustion engine having a valve controlled opening adapted to establish communication between the combustion chamber and the atmosphere, conduit means communicating with said opening and also being open at points adjacent the portions of the engine from which carbon is to be removed and operable upon the explosion of a charge to produce an induced current of flame against said portions to thereby concentrate such flame at such parts and burn off the carbon.

4. In an internal combustion engine, in combination with a spark plug, a conduit having an open end terminating adjacent the terminals of the spark plug and adapted to induce a draft of flame against the same, means of communication between said conduit and the atmosphere adapted to establish a suction draft upon the conduit, and a valve for controlling said atmospheric means of communication.

5. In an internal combustion engine, means for removing carbon from the spark plug, consisting of a conduit having an open end terminating adjacent the spark plug, a conduit communicating with the atmosphere, and also with the first conduit, and means of communication between the cylinder and said second conduit whereby an induced draft of flame will be drawn against the spark plug through said conduits and through said means into the atmosphere upon the explosion stroke of the engine.

6. In an internal combustion engine, in combination with a spark plug, a conduit having an open end terminating adjacent the terminals of the spark plug and adapted to concentrate the flame thereon, a perforated circumferential conduit communicating with the opposite end of said first conduit and located in the combustion chamber beyond the limit of stroke of the piston, said second conduit having means of communication with the passageway leading to the atmosphere, and a valve controlling said passageway.

In witness whereof, I have hereunto set my hand and seal at Indianapolis, Indiana, this 6th day of June, A. D. nineteen hundred and sixteen.

ROBERT C. BERRY. [L. S.]

Witnesses:
H. P. DOOLITTLE,
A. C. RICE.

Copies of this patent may be obtained for five cents each, by addressing the "Commissioner of Patents, Washington, D. C."